(12) United States Patent
Jiang et al.

(10) Patent No.: US 11,169,724 B2
(45) Date of Patent: Nov. 9, 2021

(54) METHOD, ELECTRONIC DEVICE, AND PROGRAM PRODUCT FOR SCHEDULING REQUESTS FOR RECLAIMING STORAGE SPACE

(71) Applicant: EMC IP Holding Company LLC, Hopkinton, MA (US)

(72) Inventors: Changxu Jiang, Chengdu (CN); Zhenzong Jiang, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/585,578

(22) Filed: Sep. 27, 2019

(65) Prior Publication Data

US 2020/0133551 A1 Apr. 30, 2020

(30) Foreign Application Priority Data

Oct. 30, 2018 (CN) .......................... 201811280500.X (51) Int. Cl.
*G06F 3/06* (2006.01)

(52) U.S. Cl.
CPC .......... *G06F 3/0644* (2013.01); *G06F 3/0608* (2013.01); *G06F 3/0631* (2013.01); *G06F 3/0653* (2013.01); *G06F 3/0659* (2013.01); *G06F 3/0683* (2013.01)

(58) Field of Classification Search
CPC .... G06F 3/0644; G06F 3/0659; G06F 3/0631; G06F 3/0608; G06F 3/0683; G06F 3/0653; G06F 3/0689; G06F 3/0604; G06F 12/0253

See application file for complete search history.

(56) References Cited

U.S. PATENT DOCUMENTS

| 6,170,042 | B1 * | 1/2001 | Gaertner | G06F 3/0613 |
| | | | | 710/39 |
| 8,949,555 | B1 * | 2/2015 | Karamcheti | G06F 3/0655 |
| | | | | 711/158 |
| 9,535,630 | B1 | 1/2017 | Bono et al. | |
| 9,864,753 | B1 | 1/2018 | Armangau et al. | |
| 9,940,331 | B1 | 4/2018 | Bono et al. | |
| 10,007,671 | B1 | 6/2018 | Bono et al. | |
| 10,120,887 | B1 | 11/2018 | Patel et al. | |
| 10,146,450 | B1 | 12/2018 | Lin et al. | |
| 10,235,286 | B1 | 3/2019 | Yu et al. | |
| 10,552,056 | B2 | 2/2020 | Marchenko et al. | |
| 10,592,469 | B1 | 3/2020 | Bassov et al. | |
| 10,613,790 | B1 | 4/2020 | Armangau et al. | |

(Continued)

*Primary Examiner* — David Yi
*Assistant Examiner* — Trung-Hao Joseph Nguyen
(74) *Attorney, Agent, or Firm* — BainwoodHuang (57) ABSTRACT

Techniques perform data processing. Such techniques involve: generating, based on a time sequence that a plurality of requests are detected, a first-input first-output (FIFO) queue comprising the plurality of requests sent by a plurality of storage pools in a storage system for reclaiming storage spaces of the plurality of storage pools. Such techniques further involve: determining respective available storage spaces of the plurality of storage pools. Such techniques further involve: updating, based on the available storage spaces, a sequence of the plurality of requests in the FIFO queue for processing. Such techniques can effectively alleviate the problem that the storage pools are short of storage spaces.

13 Claims, 7 Drawing Sheets

(56) References Cited

U.S. PATENT DOCUMENTS

| | | | |
|---|---|---|---|
| 10,678,453 B2 | 6/2020 | Zhao et al. | |
| 10,789,210 B2 | 9/2020 | Yan et al. | |
| 2007/0220220 A1* | 9/2007 | Ziv | G06F 3/0605 |
| | | | 711/159 |
| 2008/0033330 A1* | 2/2008 | Moore | A61M 1/0084 |
| | | | 602/43 |
| 2015/0370586 A1* | 12/2015 | Cooper | G06F 12/0223 |
| | | | 710/308 |
| 2017/0357531 A1* | 12/2017 | Zhang | G06F 9/5005 |
| 2020/0004456 A1* | 1/2020 | Williams | G06F 9/3855 |
| 2020/0341687 A1* | 10/2020 | Lee | G06F 3/0653 |

\* cited by examiner

METHOD, ELECTRONIC DEVICE, AND PROGRAM PRODUCT FOR SCHEDULING REQUESTS FOR RECLAIMING STORAGE SPACE

CROSS-REFERENCE TO RELATED APPLICATION

This application claims priority to Chinese Patent Application No. CN201811280500.X, on file at the China National Intellectual Property Administration (CNIPA), having a filing date of Oct. 30, 2018, and having "METHOD, ELECTRONIC DEVICE, AND PROGRAM PRODUCT FOR SCHEDULING REQUESTS FOR RECLAIMING STORAGE SPACE" as a title, the contents and teachings of which are herein incorporated by reference in their entirety.

FIELD

Embodiments of the present disclosure generally relate to a computer system or a storage system, and more specifically, to a method, an electronic device and a computer program product for scheduling reclaim requests for storage spaces.

BACKGROUND

Some storage systems provide a user with storage pools for use. Typically, a storage pool may be referred to as a set of storage disks, which may be divided into a plurality of logical storage units with logical unit numbers (LUNs). The storage pool may include different types of storage disks and different types of redundant arrays of independent disks (RAID). In specific implementations, a storage system may allocate all storage disks in the arrays to a single storage pool or create a plurality of storage pools.

As storage space of a storage pool is allocated for use, available storage space of the storage pool is decreased correspondingly. In order to reclaim storage space, the storage pool may send storage space reclaim requests (which may be referred to as reclaim requests hereinafter), so as to delete snapshots, shrink a file system and the like. In general, these reclaim requests may run in a storage system as background jobs. However, conventional manners for reclaiming the storage space will impact performance of the storage system, resulting in poor user experience.

SUMMARY

Embodiments of the present disclosure relate to a method, an electronic device and a computer program product for scheduling reclaim requests for storage spaces.

In a first aspect of the present disclosure, there provides a computer-implemented method. The method includes: generating, based on a time sequence that a plurality of requests are detected, a first-input first-output (FIFO) queue including the plurality of requests sent by a plurality of storage pools in a storage system for reclaiming storage spaces of the plurality of storage pools; determining respective available storage spaces of the plurality of storage pools; and updating, based on the available storage spaces, a sequence of the plurality of requests in the FIFO queue for processing.

In a second aspect of the present disclosure, there provides an electronic device. The electronic device includes at least one processor and at least one memory storing computer program instructions. The at least one memory and the computer program instructions are configured, together with the at least one processor, to cause the electronic device to: generate, based on a time sequence that a plurality of requests are detected, a first-input first-output (FIFO) queue including the plurality of requests sent by a plurality of storage pools in a storage system for reclaiming storage spaces of the plurality of storage pools; determine respective available storage spaces of the plurality of storage pools; and update, based on the available storage spaces, a sequence of the plurality of requests in the FIFO queue for processing.

In a third aspect of the present disclosure, there provides a computer program product. The computer program product is tangibly stored on a non-volatile computer-readable medium and includes machine-executable instructions. The machine-executable instructions, when executed, cause a machine to perform: generating, based on a time sequence that a plurality of requests are detected, a first-input first-output (FIFO) queue including the plurality of requests, the plurality of requests sent by a plurality of storage pools in a storage system for reclaiming storage spaces of the plurality of storage pools; determining respective available storage spaces of the plurality of storage pools; and updating, based on the available storage spaces, a sequence of the plurality of requests in the FIFO queue for processing.

It would be appreciated that this Summary is not intended to identify key features or essential features of the claimed subject matter, nor is it intended to be used to limit the scope of the claimed subject matter. Other features of the present disclosure will be made apparent by the following description.

BRIEF DESCRIPTION OF THE DRAWINGS

Through the following detailed description with reference to the accompanying drawings, the above and other objectives, features, and advantages of example embodiments of the present disclosure will become more apparent. Several example embodiments of the present disclosure will be illustrated by way of example but not limitation in the drawings in which.

Throughout the drawings, the same or similar reference symbols refer to the same or similar elements.

DETAILED DESCRIPTION OF EMBODIMENTS

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles and spirits of the present disclosure will now be described with reference to several example embodiments illustrated in the drawings. It should be appreciated that description of those embodiments is merely to enable those skilled in the art to better understand and further implement example embodiments disclosed herein and is not intended for limiting the scope disclosed herein in any manner.

As indicated above, reclaim requests sent from storage pools of a storage system may run as background jobs in the storage system. In the conventional storage system, in particular a midrange storage system implementation, performance of operation related to reclaiming storage spaces is not the best. For example, it is probably a time-consuming task for the storage system to reclaim storage spaces back to the storage pools, because most of the background jobs are actually queued to be executed by processors of the storage system, and the process of processing storage spaces reclaiming may be quite complicated. Therefore, in the conventional storage system, although it probably takes only, for example, minutes for the processors to process a certain reclaim request, a lot of time (for example, even days) is often spent on waiting for the processor to process, such that it actually takes days to complete processing of the reclaim request.

It is well known that, in addition to allocation of the storage space, reclaiming of the storage space will also impact available storage space of each storage pool. Typically, if the available storage space of the storage pool is less than a certain threshold, the performance of the storage pool will be degraded, and the file system or LUN thereof become read-only. Hence, there may be such case that a certain storage pool has sent a plurality of reclaim requests, but since the processor fails to process these reclaim requests timely, the storage pool has insufficient storage space for providing storage service to a user.

For further illustration, the following example scenario is taken into consideration. A user configures a plurality of storage pools in a storage system, capacity of one of the plurality of storage pools is a small and 90% of the total capacity has been allocated for use. At certain time, it is found by a user that a large amount of snapshots consume the capacity of the storage pool, thus starts deleting snapshots for the storage pool. However, at this time, a great number of other reclaim requests from other storage pools have been waiting for processing by the processors. As a result, the storage pool is still short of storage space after a period of time, because its reclaim requests cannot be processed in time.

Consequently, in a case that there are too many reclaim requests waiting to be processed, user experience of the storage system becomes poor since the storage pool is kept at a full state for a long period of time and cannot be relieved. Expanding the capacity of the storage pool is certainly a solution in the case, but storage disks (in particular, flash disks) for expanding the capacity of the storage pool are often expensive, thus increasing the cost of the storage system. Moreover, an expansion of capacity of storage is not reversible, which probably causes a waste of the capacity of the storage.

The inventors of the present disclosure find that there may be different available storage spaces (for example, which may be represented by percentages of remaining capacities to a total capacity) for different storage pools during a process that a storage system is used. In an example case, it is assumed that the first of two storage pools is nearly full, while only 20% of the storage space of the second storage pool is allocated for use. In this case, it is unreasonable that the storage system processes the reclaim requests of the second storage pool and keeps the reclaim requests of the first storage pool waiting. At this time, deferring the reclaim requests of the second storage pool causes less impact on the storage system, and at this time, prioritizing the reclaim requests of the first storage pool is helpful for solving the problem of insufficient storage space of the first storage pool.

In view of the foregoing problem and other potential problems in the conventional solution, and through the above inventors' analysis, the embodiments of the present disclosure provide a method, an electronic device and a computer program product for scheduling requests for reclaiming storage spaces. The basic idea of the embodiments of the present disclosure is: adjusting processing sequence of recovery requests of storage pool based on available storage spaces of storage pools. For example, a recovery request for a storage pool with less storage space may be prioritized and accelerated, so that the problem of being lack of storage space in the storage pool is effectively relieved. The embodiments of the present disclosure will be described below in detail with reference to accompany drawings.

Figure 1:
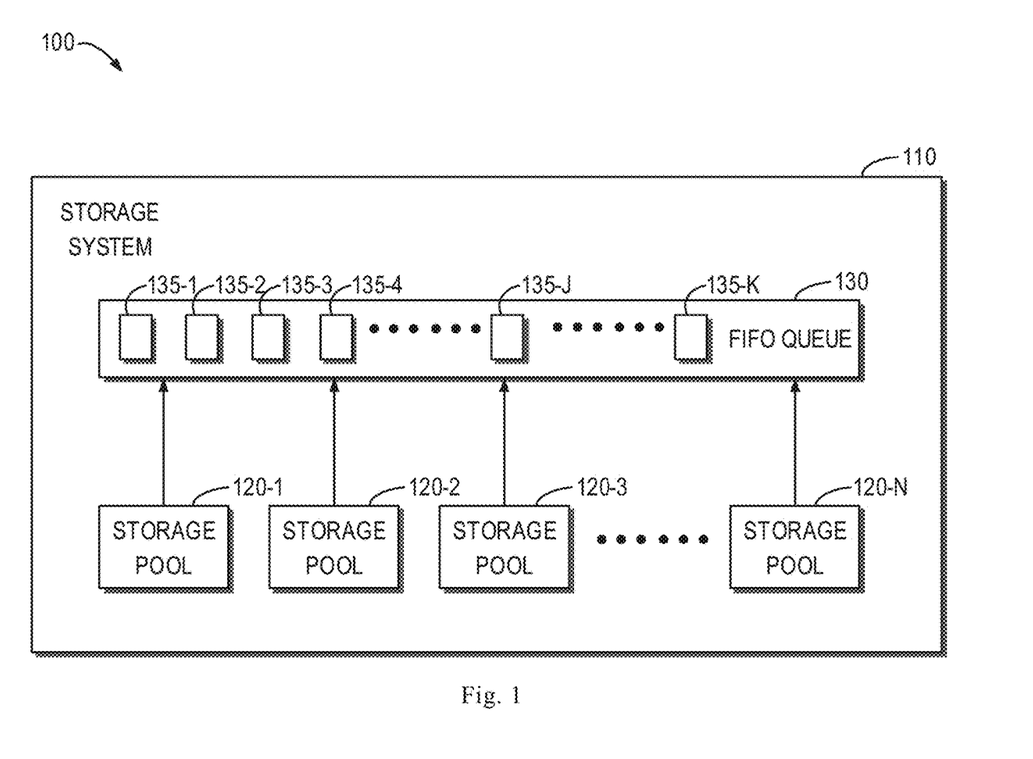
FIG. 1 illustrates a schematic block diagram of an example environment in which embodiments of the present disclosure can be implemented.

FIG. 1 illustrates a schematic block diagram of an example environment 100 in which the embodiments of the present disclosure can be implemented. As shown in FIG. 1, a storage system 110 is included in the example environment 100. The storage system 110 includes storage pools 120-1 to 120-N for a user to use. Hereinafter, the storage pools 120-1 to 120-N may be collectively referred to as storage pools 120. It would be appreciated that, although the system 110 is depicted as including a specified number of storage pools 120-1 to 120-N in FIG. 1, the storage system 110 may include any number of storage pools in other embodiments.

In some embodiments, each of the storage pools 120 may include a set of storage disks, which may provide a particular storage characteristic for resources using them. For example, a configuration of storage pool may define types and capacities of storage disks in the storage pool. For a physical deployment, the configuration of the storage pool may further define configuration of redundant arrays of independent drives (RAID) (types and width of stripe of RAID) for these storage disks. In some embodiments, the set of the storage disks of the storage pool may be divided into a plurality of logical storage units with Logical Unit Numbers (LUNs). In other embodiments, each of the storage pools 120 may be any set of storage resource for providing a storage space for use.

As mentioned above, in order to reclaim the storage spaces of the storage pools 120, the storage pools 120 may send reclaim requests 135-1 to 135-K (which are collectively referred to as reclaim requests 135) for reclaiming the storage spaces, for example, for facilitating deleting snapshots, shrinking a file system, and the like. The storage system 110 may generate, based on a time sequence that the reclaim requests 135-1 to 135-K are detected, a first input first output (FIFO) queue 130 including the reclaim requests 135-1 to 135-K. The FIFO queue 130 means that the reclaim requests 135-1 to 135-K queued therein will be processed sequentially by the storage system 110 (for example, its processors).

It would be appreciated that any one of the reclaim requests 135-1 to 135-K may be sent by any one of the storage pools 120-1 to 120-N, i.e., there may be an arbitrary correspondence relationship between the reclaim requests 135-1 to 135-K and the storage pools 120-1 to 120-N. For example, a plurality of reclaim requests of the reclaim requests 135 may be sent by the same storage pool, and the reclaim requests 135 may also not include reclaim requests from certain storage pools. In other words, the reclaim requests 135-1 to 135-K are arranged in the FIFO queue 130 according to the time sequence that the reclaim requests 135-1 to 135-K are detected (i.e., are sent), regardless of from which storage pool the reclaim requests are sent.

In addition, it would be appreciated that, although specified numbers of FIFO queues 130 and reclaim requests 135 are illustrated in FIG. 1, the storage system 110 may generate any number of FIFO queues each of which may include any number of reclaim requests, in other embodiments. Operations associated with the embodiments of the present disclosure will be described below with reference to FIG. 2.

Figure 2:
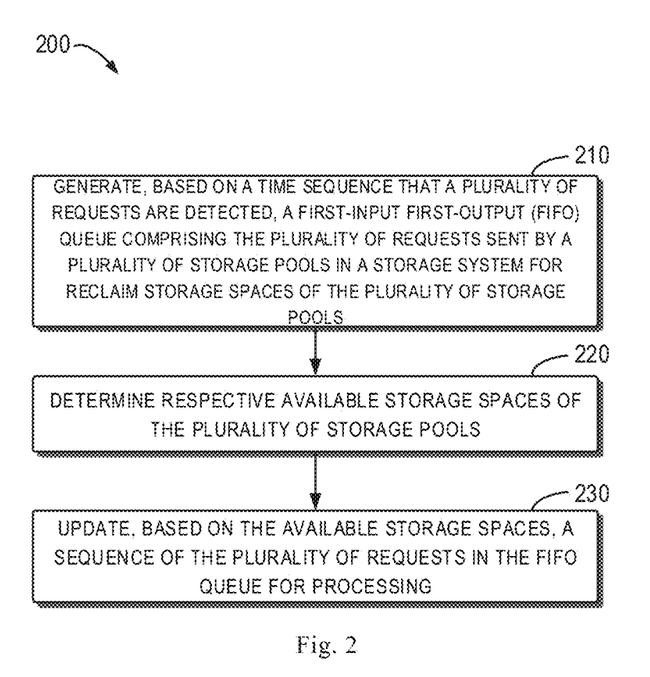
FIG. 2 illustrates a flowchart of a computer-implemented method according to embodiments of the present disclosure.

FIG. 2 illustrates a flowchart of a computer-implemented method 200 according to embodiments of the present disclosure. In some embodiments, the method 200 may be implemented by the storage system 110 in the example environment 100, for example, processors or processing units of the storage system 110, or various functional modules of the storage system 110. For ease of discussion, referring to FIG. 1, the method 200 will be discussed below with the method 200 implemented by the storage system 110 as an example. However, it would be appreciated that, in other embodiments, the method 200 may also be implemented by other electronic device or computer device independent of the example environment 100.

At 210, as described above, the storage pool 120 may send a plurality of reclaim requests 135-1 to 135-K to reclaim the storage spaces. Correspondingly, after detecting these reclaim requests 135-1 to 135-K, the storage system 110 generates the FIFO queue 130 based on the time sequence that the reclaim requests 135-1 to 135-K are detected. The FIFO queue 130 includes the plurality of reclaim requests 135-1 to 135-K. In some embodiments, the time of detecting the reclaim requests 135 may be regarded as time of sending them. In other embodiments, the time of detecting the reclaim requests 135 may be time of lagging behind the time of sending them for a fixed time value. In general, the time sequence that the reclaim requests 135 are detected should be consistent with the time sequence that they are sent.

At 220, the storage system 110 determines respective available storage spaces of the plurality of storage pools 120-1 to 120-N. For example, the determined available storage spaces may be represented by percentages of remaining capacities to total capacities of the storage pools 120, and thus can reflect storage levels of the storage pools 120 with different capacities. Additionally or alternatively, the determined available storage spaces may be represented by absolute values of the remaining capacities of the storage pools 120. In other embodiments, the available storage spaces of the storage pools 120 may be represented by any other appropriate metric capable of reflecting available capacities of the storage pools 120 having not been allocated.

In some embodiments, the storage system 110 may determine, based on a state that a storage space of a certain storage pool (for example, the storage pool 120-1) of the storage pools 120 is allocated or reclaimed, an available storage space of the storage pool 120-1. For example, when the storage space of the storage pool 120-1 is allocated for use, the storage system 110 may update the available storage space of the storage pool 120-1. Additionally or alternatively, after a request for reclaiming storage space of the storage pool 120-1 is processed by the storage system 110, the storage system 110 may also update the available storage space of the storage pool 120-1. In this way, the storage system 110 may ensure that the available storage spaces of the storage pools 120 reflect accurately the actual available storage spaces thereof.

At 230, the storage system 110 updates, based on available storage spaces of the storage pools 120-1 to 120-N, the sequence of the plurality of requests 135-1 to 135-K in the FIFO queue 130 for processing. As one kind of example, the storage system 110 may determine, from the plurality of storage pools 120-1 to 120-N, a storage pool with an available storage space less than a threshold, for example, the storage pool 120-2. Subsequently, the storage system 110 may adjust a position of at least one request sent by the storage pool 120-2 in the FIFO queue 130. As used herein, the threshold may be predetermined by a technician or a user, for example, according to a need of design or use. In this way, it can be ensured that the reclaim requests of storage pool with a small storage capacity are prioritized.

In some cases, if there are a plurality of storage pools whose available storage space is less than the threshold, the storage system 100 may determine, from these storage pools, the storage pool with the least available storage space, and then adjust the reclaim request of this storage pool. Alternatively, the storage system 110 may select, from these storage pools, randomly one storage pool with available storage space less than the threshold, and then prioritize the reclaim request of this storage pool. In other embodiments, the storage system 110 may select one storage pool from these storage pools in other reasonable manners, and then prioritize the reclaim request of this storage pool, for example, selecting, from these storage pools, the storage pool that sent the reclaim request the earliest, etc.

In some embodiments, after determining that reclaim requests of a certain storage pool (for example, the storage pool 120-2) are required to be prioritized, the storage system 110 may determine a number of requests to be adjusted in the at least one request sent by the storage pool 120-2. Thereafter, the storage system 110 may arrange the number of requests in the at least one request at a head of the FIFO queue 130. In other words, the storage system 110 may adjust a predetermined number of requests of the storage pool 120-2 every time, which may be determined, for example, according to a technical environment and a design need. In this way, the storage system 110 may adjust reasonably a level that the reclaim requests are adjusted each time.

Alternatively, in addition to prioritizing the reclaiming requests of the storage pools with less available storage spaces, the processing system may update the sequence of the plurality of requests 135-1 to 135-K in the FIFO queue 130 in other manners. For example, the storage system 110 may arrange the reclaim requests of the storage pool with more storage space at the end of the FIFO queue 130. For another example, the storage system 110 may arrange the reclaim requests of the storage pools 120-1 to 120-N in the FIFO queue 130, based on a size sequence of available storage spaces therein, and so on. It would be appreciated that the storage system 110 may update the sequence of the plurality of requests 135-1 to 135-K in the queue 130, based on the available storage spaces of the storage pools 120-1 to 120-N, to avoid that the storage pools 120-1 to 120-N have insufficient storage spaces.

In some embodiments, the storage system 110 may update periodically the sequence of the plurality of requests 135-1 to 135-N at a predetermined time interval. As used herein, the predetermined time interval herein may be predetermined by a technician or a user, for example, according to a need of design or user. As such, the storage system 110 may complete a processing of some reclaim requests at the time interval. Otherwise, if the reclaim request (for example, the reclaim request 135-J) which is arranged last time at the front of the FIFO queue 130 to be prioritized has not been processed and the storage system 110 performs updating the sequence of the reclaim requests again, the storage system 110 will perform a repeat and useless job (for example, it is determined again that the storage pools 120-1 to 120-N are required to be prioritized), thereby wasting of computing resources. In addition, by updating the sequence of the reclaim requests periodically, the storage system 110 may automatically maintain that reclaim requests of the storage pool with less available storage space are prioritized, without a need of manual intervention.

As compared with the conventional solution, the solution proposed in the embodiments of the present disclosure exhibits an excellent performance in terms of alleviating the problem that storage pools are short of storage spaces, and brings a higher efficiency. A simulated implementation of the conventional solution and the embodiments of the present disclosure will be described below with reference to FIGS. 3 to 6, to further explain the above technical advantages of the embodiments of the present disclosure over the conventional solution.

Figure 3:
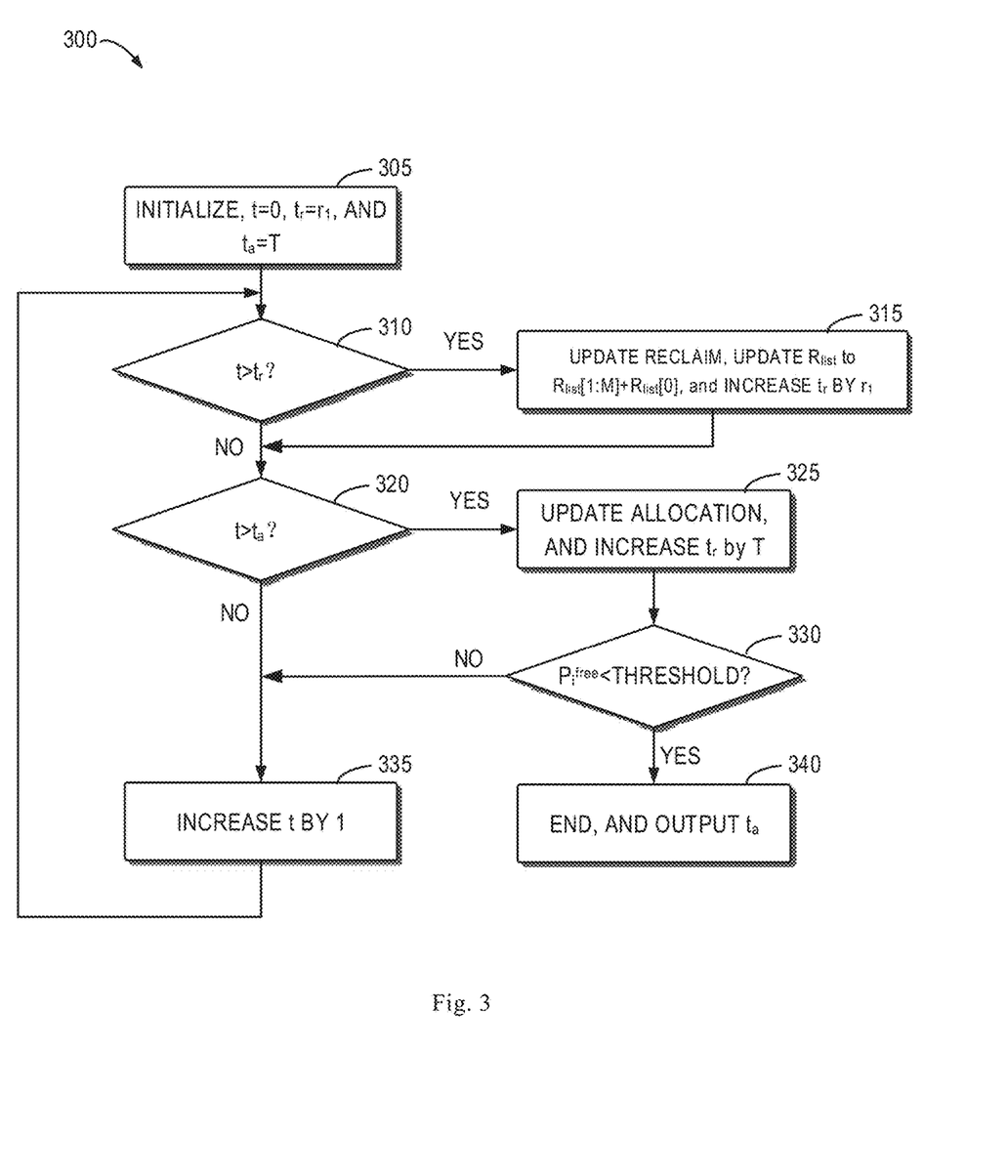
FIG. 3 illustrates a flowchart of a simulated process of processing reclaim requests according to a conventional solution.

FIG. 3 illustrates a flowchart of a simulated process of processing reclaim requests according to the conventional solution. In some embodiments, the simulated process 300 may be performed through a computer-implemented simulation system. Additionally or alternatively, the process 300 may also be performed by any computer device or electronic device with a simulation capability.

In order to describe the simulation, the following symbolic representation will be employed. N represents the number of storage pools in a storage system. K is the number of reclaim requests of storage space of each storage pool. $U_i^{total}$ is a total capacity of each storage pool, where i is valued from 1 to N. $P_i^{free}$ is a percentage of remaining capacity of each storage pool, where i is valued from 1 to N. $U_i^{used}$ is a percentage of used capacity of each storage pool, where i is valued from 1 to N.

R is a reclaim matrix of storage pools, where a row of matrix is $R_i=[r_{i,1}, r_{i,2}, \ldots, r_{i,K}]$, the element $r_{i,k}$ is normalized time which represents the time for completing processing of a reclaim request k (k being valued from 1 to K) of a storage pool i (i being valued from 1 to N), and R therefore may be expressed as follows:

$$R = \begin{pmatrix} r_{1,1} & \cdots & r_{1,K} \\ \vdots & \ddots & \vdots \\ r_{N,1} & \cdots & r_{N,K} \end{pmatrix} = \begin{pmatrix} R_1 \\ \vdots \\ R_N \end{pmatrix}$$

$R_{list}$ is a list including all elements of the matrix R, and the sequence of elements may be scrambled to simulate the queue of the reclaim requests, i.e., $R_{list}=[r_1, r_2, \ldots, r_M]$, M=N*K, where $r_1$ is the first element in $R_{list}$. The vector $B=[b_1, b_2, \ldots, b_N]$ is a reclaim rate, where the element $b_i$ is the reclaim rate of the storage pool i (i being valued from 1 to N). For example, the capacity reclaimed by the reclaim request k may be expressed as $b_i*r_{i,k}$. T is a period of time for capacity allocation of each storage pool. The vector $D=[d_1, d_2, \ldots, d_N]$ is the capacity that is allocated for use at the time interval T, where element $d_i$ is the capacity that is allocated to the storage pool i for use within the period of time T. $T_{interval}$ is a cycle when the reclaim requests in the reclaim requests queue are updated. The process 300 will be described below with the process 300 performed by a simulation system as an example, but it would be appreciated that the process 300 may also be performed by other computer or electronic device for simulation.

At 305, the simulation system initializes an environment of the storage system and sets start time to t=0, $t_r=r_1$, $t_a=T$. At 310, the simulation system determines whether t is greater than $t_r$. If t is greater than $t_r$, it indicates that reclaim request $r_1$ of the storage pool i is completed at time $t_r$. Hence, it is needed to perform reclaim update for $P_i^{free}$ and $P_i^{used}$ and thus the process 300 moves to 315. At 315, the simulation system updates the $P_i^{free}$ to $P_i^{free}+b_i*r_1/U_i^{total}$, and updates the $P_i^{used}$ to $P_i^{used}-b_i*r^1/U_i^{total}$. Moreover, the simulation system updates $R_{list}$ to $R_{list}[1:M]+R_{list}[0]$, to arrange the previous second reclaim request in the reclaim request queue to the front of the reclaim request queue. In addition, the simulation system updates $t_r$ to $t_r+r_1$. Then, the process 300 moves to 320. On the other hand, if the simulation system determines at 310 that t is not greater than $t_r$, the process 300 also moves to 320.

At 320, the simulation system determines whether t is greater than $t_a$. If t is greater than $t_a$, it indicates that the capacity allocation of the storage pools occurs at $t_a$ (it is assumed here that capacity allocation is performed for all the storage pools at this time). Therefore, it is needed to update allocation for $P_i^{free}$ and $P_i^{used}$ for all i (which is valued from 1 to N), thus the process 300 moves to 325. At 325, for each i, the simulation system updates $P_i^{free}$ to $P_i^{free}-d_i/U_i^{total}$, and $P_i^{used}$ is updated to $P_i^{used}+d_i/U_i^{total}$. In addition, the simulation system updates $t_a$ to $t_a+T$.

Next, the process 300 moves to 330. At 330, the simulation system determines whether there is an event of storage space shortage occurred for any storage pool i, i.e., it determines whether $P_i^{free}$ of any storage pool i is less than a threshold which, for example, may be set to 5%. It would be appreciated that the specific numerical value here is provided only as an example, without any intention of limiting the scope of the embodiments of the present disclosure in any manner, which may be any other appropriate numerical value in other embodiments.

If there is an event of storage space shortage occurred for any storage pool i, the simulation system outputs the value of $t_a$ at this time, which is a period of time from a starting time of simulation to the time when insufficiency of storage space occurs in the storage pool. If there is no storage space short of storage space, the process 300 moves to 335. On the other hand, if the storage system determines at 320 that t is not greater than $t_a$, the process 300 also moves to 335. At 335, t is updated to t+1, i.e., a normalized time length is added, and the process 300 returns to 310 such that the simulation system is continuously performing the simulation process 300 until an available storage space of a certain storage pool is less than a predetermined threshold.

Figure 4:
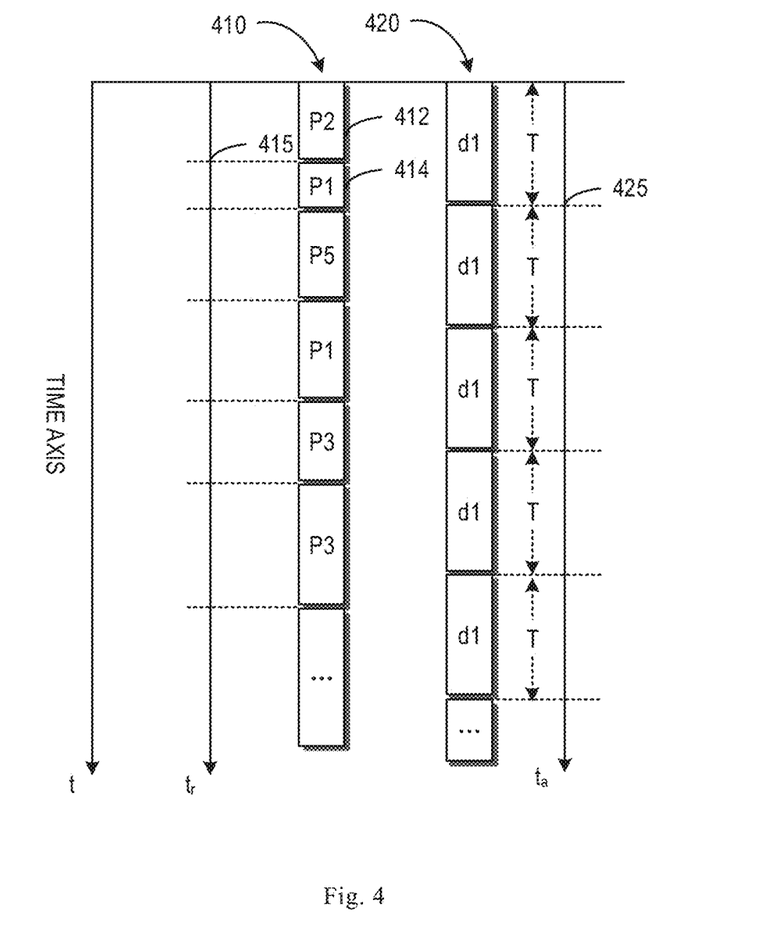
FIG. 4 illustrates a schematic diagram of simulated processing of reclaim requests according to a conventional solution.

FIG. 4 illustrates a schematic diagram of simulated processing of reclaim requests according to the conventional solution. As shown in FIG. 4, reclaim requests from different storage pools i (i being valued from 1 to N) are arranged in a queue 410 to be processed sequentially by the storage system. For example, at time point 415, processing of the reclaim request P2 412 from the storage pool 2 is to be completed while the reclaim request P1 414 from the storage pool 1 is about to be processed, and so on. Furthermore, a capacity allocation queue 420 simulates allocation of storage space to a storage pool over time in a simple manner. That is, after each time interval T, storage space d1 of each storage pool is allocated for use. For example, at the time point 425, such allocation of storage space is performed, and so on.

Figure 5:
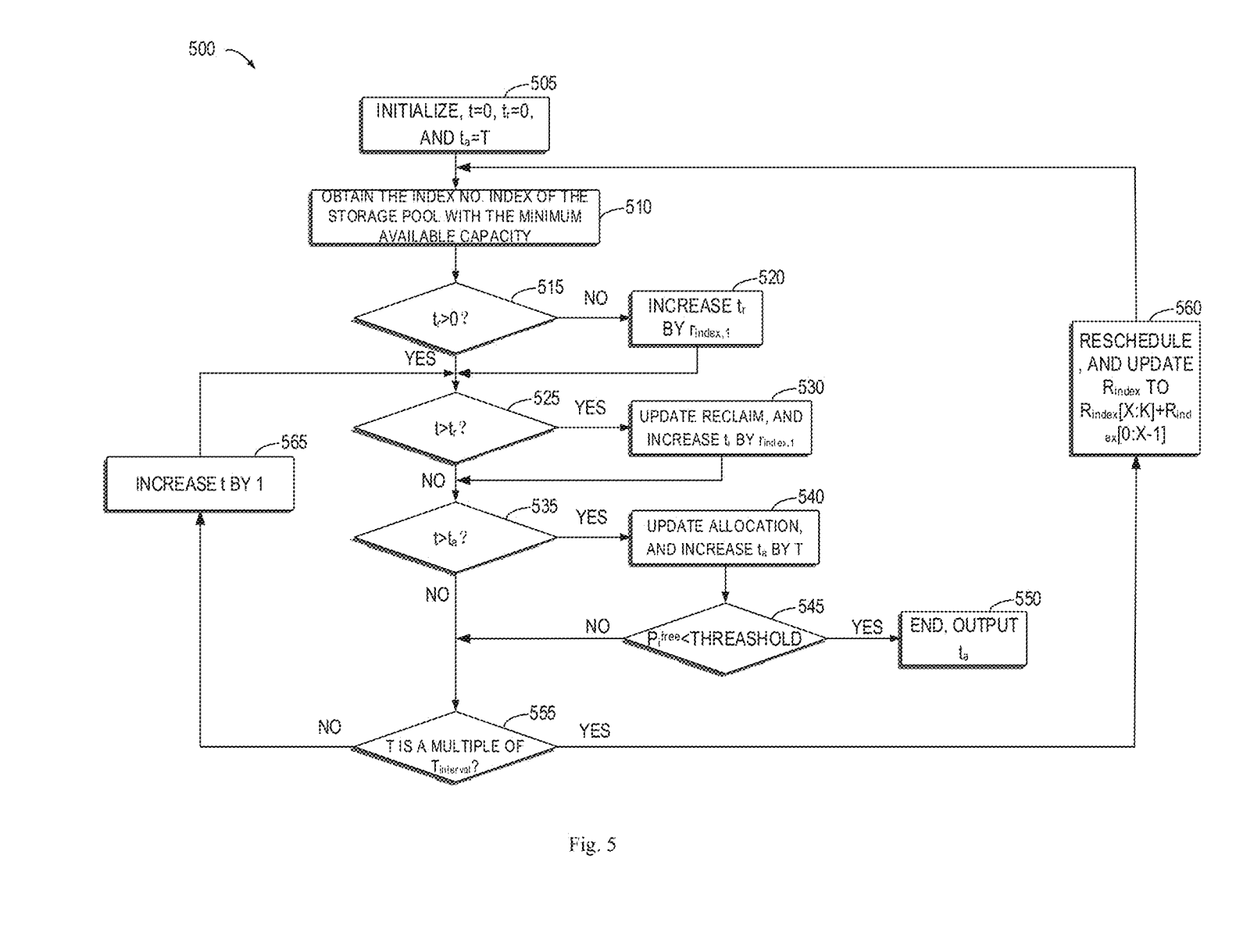
FIG. 5 illustrates a flowchart of a simulated process of processing reclaim requests according to an example solution of embodiments of the present disclosure.

FIG. 5 illustrates a flowchart of a simulated process 500 of processing reclaim requests according to an example solution of embodiments of the present disclosure. In some embodiments, the simulated process 500 may be performed by a computer-implemented simulation system. Additionally or alternatively, the process 500 may be performed by any computer device or electronic device with a simulation capacity. During this simulation, the symbolic representation as described above will be employed. The process 500 will be described below with a process 500 performed by a simulation system as an example.

At 505, the simulation system initializes the environment of the storage system and sets start time to t=0, $t_r$=0 and $t_a$=T. At 510, the simulation system obtains an index No. index of the storage pool with the minimum available capacity in the storage pools. At 515, the simulation system determines whether t is greater than 0. If $t_r$ is equal to 0, the process 500 moves to 520. At 520, the simulation system $t_r$ is updated to $t_r+r_{index,1}$. Next, the process 500 moves to 525. On the other hand, if the simulations system determines at 515 that t is greater than 0, the process 500 also moves to 525.

At 525, the simulation system determines whether t is greater than $t_r$. If t is greater than $t_r$, it indicates that the reclaim request $r_{index,1}$ of the storage pool with the index No. index is completed at time $t_r$, and it therefore is needed to perform reclaim update for $P_{index}^{free}$ and $P_{index}^{used}$. Thus, the process 500 moves to 530. At 530, the simulation system updates $P_{index}^{free}$ to $P_{index}^{free}+b_{index}*r_{index,1}/U_{index}^{total}$, and updates $P_{index}^{used}$ to $P_{index}^{used}-b_{index}*r_{index,1}/U_{index}^{total}$. Moreover, the simulation system updates $t_r$ to $t_r+r_{index,1}$. Then, the process 500 moves to 535. On the other hand, if the simulation system determines at 525 that t is not greater than $t_r$, the process 500 also moves to 535.

At 535, if t is greater than $t_a$, it indicates that the capacity allocation of the storage pools occurs at time $t_a$ (it is assumed here that the capacity allocation is performed for all the storage pools at this time), thus the system will update allocation for $P_i^{free}$ and $P_i^{used}$, for all i (which is valued from 1 to N). Hence, the process 500 moves to 540. At 540, for each i value, the simulation system updates $P_i^{free}$ to $P_i^{free}-d_i/U_i^{total}$, and updates $P_i^{used}$ to $P_i^{used}+d_i/U_i^{total}$. Further, the simulation system updates $t_a$ to $t_a+T$. Then, the process 500 moves to 545.

At 545, the simulation system determines whether an event of storage space shortage occurs to any storage pool i, i.e., it determines whether $P_i^{free}$ of any storage pool i is less than a threshold which, for example, may be set to 5%. It would be appreciated that the specific numerical value here is provided only as an example, without any intention of limiting the scope of the embodiments of the present disclosure in any manner, which may be any other appropriate numerical value in other embodiments. If, the simulation system determines for any storage pool i that the event of storage space shortage that $P_i^{free}$ is less than a threshold occurs, the simulation system outputs $t_a$ at 550, which is a period of time from the starting time of the simulation to the time when storage space insufficiency occurs in a certain storage pool. In turn, if the simulation system determines that there is no storage pool short of available storage space, the process 500 moves to 555. On the other hand, if the simulation system determines at 535 that t is not greater than $t_a$, the process 500 also moves to 555.

At 555, if t is a multiple of $T_{interval}$, it indicates that the sequence of reclaim requests in the FIFO queue will be updated at this time. Therefore, the process 500 moves to 560. At 560, the simulation system updates $R_{index}$ to $R_{index}[X:K]+R_{index}[0:X-1]$, to arrange the following X reclaim requests of the storage pool with the index No. index at the front of the reclaim request queue. Then, the process 500 moves to 510, to re-obtain the index number of the storage pool with the minimum available storage capacity. On the other hand, if the simulation system determines at 555 that t is not multiple of the $T_{interval}$, it indicates that the sequence of the reclaim requests is not updated at this time. Hence, the process 500 moves to 565. At 565, the simulation system updates t to t+1, i.e., a normalized time length is added. Subsequently, the process 500 returns to 525, to continue to perform the simulation process 500.

Figure 6:
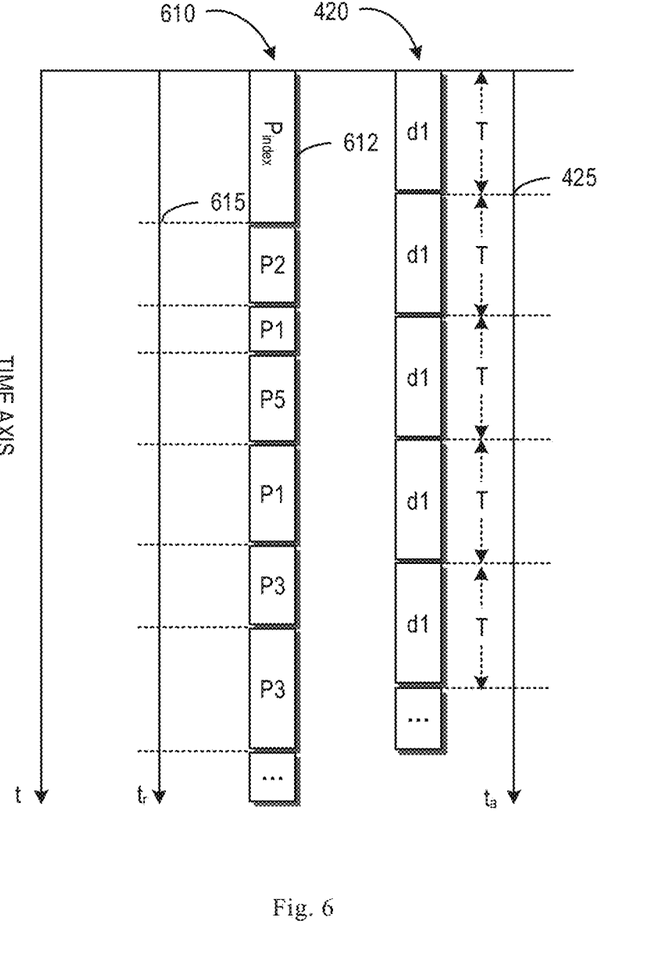
FIG. 6 illustrates a schematic diagram of simulated processing of reclaim requests of an example solution according to embodiments of the present disclosure.

FIG. 6 illustrates a schematic diagram of simulated processing of reclaim requests according to an example solution of embodiments of the present disclosure. As shown in FIG. 6, reclaim requests from different storage pools i (i being valued from 1 to N) are lined in the queue 610 to be processed sequentially. However, unlike in the conventional solution as depicted in FIG. 4, since the simulation system determines a storage pool with an index No. index has the least available storage space, a reclaim request $P_{index}$ 612 from the storage pool index is arranged at the front of the queue 610 to be prioritized. For example, at a time point 615, the processing of the reclaim request $P_{index}$ 612 will be completed. At this time, the simulation system updates available storage space of the storage pool index, and updates the sequence of the reclaim requests in the reclaim request queue 610 at a time interval $T_{interval}$. In addition, the capacity allocation queue 420 is similar to that is depicted in FIG. 4, which is not repeated herein.

Through the above simulation algorithm, specific values of individual parameters may be selected for testing respective performances of the conventional solution and the solution of the embodiments of the present disclosure. For example, during initializing of the storage system environment, $P_i^{free}$ may be set to 50%, i.e., $P_i^{used}$ is also set to 50%; N is set to 10, i.e., it is assumed that there are 10 storage pools; total capacity $U_i^{total}$ of each storage pool i (which is valued from 1 to N) is set to 10,000 normalized storage units; the cycle $T_{interval}$ of updating the sequence of the reclaim requests is set to 10 normalized time units; the number X of reclaim requests adjusted every time is set to 1; and the element $r_{i,k}$ of the reclaim matrix R is set to a random number between 1 to 10. It would be appreciated that the specific numerical value here is provided only as an example, without any intention of limiting the scope of the embodiments of the present disclosure in any manner, and in other embodiments, any other appropriate numerical value may be used.

On the basis of the specific values of the above parameters, different environments of storage system are simulated by setting different D, B and T, as described above, where D may represent a capacity allocated for use within a period of time T, T may represent the period of time for allocating a capacity to each storage pool, and they are used for simulating storage space allocation of each storage pool. Moreover, B may represent a reclaim rate for simulating storage space reclaiming. In this way, 9 groups of comparative performance data listed in the following Table 1 may be simulated, in which a simulation result in each group is average data of 10 simulations.

It is known from the above simulation results that the solution according to embodiments of the present disclosure exhibits an excellent performance in terms of alleviating the problem of storage space shortage, or even eliminating the problem in some scenarios (for example, the simulation results No. 7-9). In addition, the solution of the embodiments of the present disclosure is light-weighted and easy to be implemented, which reschedule the storage space reclaim requests, with no impact to other services in the storage system. Moreover, the solution of embodiments of the present disclosure is user-friendly since it does not require other interactions of user. Further, the solution of the embodiments of the present disclosure is a general scheduling method, and thus internal mechanisms of background reclaim jobs of different storage systems are not taken into account in its implementation.

Figure 7:
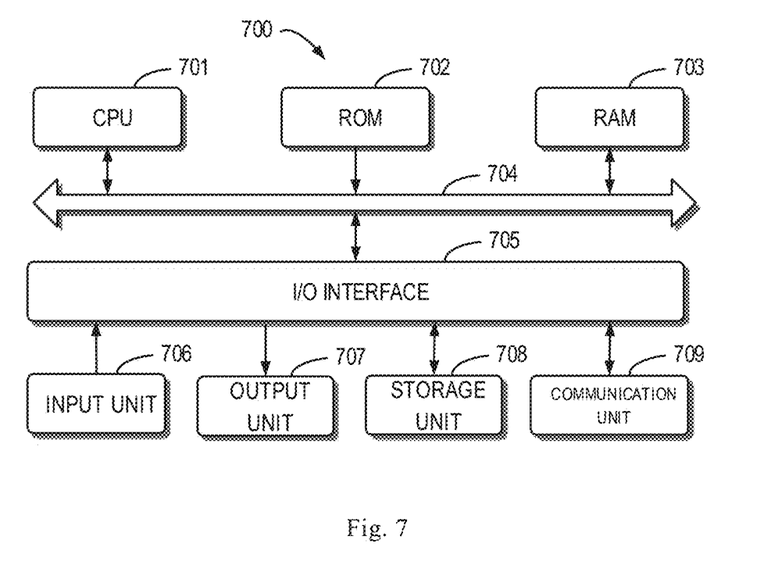
FIG. 7 illustrates a schematic block diagram of a device that can be used to implement embodiments of the present disclosure.

FIG. 7 schematically illustrates a block diagram of device 700 that can be used to implement the embodiments of the present disclosure. As shown in FIG. 7, the device 700 includes a central processing unit (CPU) 701 which may

TABLE 1

| Number of different D, B, T values | D:B (T) | Output (average value $t_a$) of the conventional solution | Output (average value $t_a$) of the embodiments of the present disclosure | Improved Percentage |
|---|---|---|---|---|
| #1 | [100.0, 100.0, 100.0, 100.0, 100.0, 100.0, 100.0, 100.0, 100.0, 100.0]:[1.0, 1.0, 1.0, 1.0, 1.0, 1.0, 1.0, 1.0, 1.0, 1.0] (T = 900) | 1054350 | 4041900 | 383% |
| #2 | [100.0, 100.0, 100.0, 100.0, 100.0, 100.0, 100.0, 100.0, 100.0, 100.0]:[1.0, 1.0, 1.0, 1.0, 1.0, 1.0, 1.0, 1.0, 1.0, 1.0] (T = 600) | 425580 | 674400 | 158% |
| #3 | [100.0, 200.0, 300.0, 100.0, 200.0, 300.0, 100.0, 200.0, 300.0, 100.0]:[1.0, 1.0, 1.0, 1.0, 1.0, 1.0, 1.0, 1.0, 1.0, 1.0] (T = 900) | 179100 | 403200 | 225% |
| #4 | [100.0, 100.0, 100.0, 100.0, 100.0, 100.0, 100.0, 100.0, 100.0, 100.0]:[1.0, 2.0, 3.0, 1.0, 2.0, 3.0, 1.0, 2.0, 3.0, 1.0] (T = 600) | 529740 | 3502800 | 661% |
| #5 | [100.0, 100.0, 100.0, 100.0, 100.0, 100.0, 100.0, 100.0, 100.0, 100.0]:[1.0, 2.0, 3.0, 1.0, 2.0, 3.0, 1.0, 2.0, 3.0, 1.0] (T = 500) | 350050 | 973500 | 278% |
| #6 | [100.0, 200.0, 300.0, 100.0, 200.0, 300.0, 100.0, 200.0, 300.0, 100.0]:[1.0, 2.0, 3.0, 1.0, 2.0, 3.0, 1.0, 2.0, 3.0, 1.0] (T = 900) | 515970 | 2616480 | 507% |
| #7 | [100.0, 100.0, 100.0, 100.0, 100.0, 100.0, 100.0, 100.0, 100.0, 100.0]:[1.0, 2.0, 3.0, 1.0, 2.0, 3.0, 1.0, 2.0, 3.0, 1.0] (T = 2000) | 584200 | Avoiding storage space shortage | Avoiding storage space shortage |
| #8 | [100.0, 100.0, 100.0, 100.0, 100.0, 100.0, 100.0, 100.0, 100.0, 100.0]:[1.0, 1.0, 1.0, 1.0, 1.0, 1.0, 1.0, 1.0, 1.0, 1.0] (T = 1000) | 1501700 | Avoiding storage space shortage | Avoiding storage space shortage |
| #9 | [100.0, 200.0, 300.0, 100.0, 200.0, 300.0, 100.0, 200.0, 300.0, 100.0]:[1.0, 2.0, 3.0, 1.0, 2.0, 3.0, 1.0, 2.0, 3.0, 1.0] (T = 1000) | 873800 | Avoiding storage space shortage | Avoiding storage space shortage | performs various appropriate actions and processing, according to computer program instructions stored in a read-only memory (ROM) 702 or computer program instructions loaded from a storage unit 708 to a random access memory (RAM) 703. The RAM 703 also stores therein various programs and data required for operations of the device 700. The CPU 701, the ROM 702 and the RAM 703 are connected via a bus 704 with one another. An input/output (I/O) interface 705 is also connected to the bus 704.

A plurality of components in the device 700 are connected to the I/O interface 705 including: an input unit 706 such as a keyboard, a mouse and the like; an output unit 707 such as various kinds of displays and loudspeakers, etc.; a storage unit 708 such as a magnetic disk, an optical disk, etc.; a communication unit 709 including a network card, a modem, and a wireless communication transceiver, etc. The communication unit 709 allows the device 700 to exchange information/data with other devices through a computer network such as the Internet and/or various kinds of telecommunications networks.

Various processes and processing described above, e.g., the method 200, may be performed by the processing unit 701. For example, in some embodiments, the methods 200 and 300 may be implemented as a computer software program that is tangibly included in a machine-readable medium, e.g., the storage unit 708. In some embodiments, part or all of the computer programs may be loaded and/or mounted onto the device 700 via the ROM 702 and/or the communication unit 709. When the computer program is loaded to the RAM 703 and executed by the CPU 701, one or more steps of the method 200 as described above may be performed.

As used herein, the term "includes" and its variants are to be read as open terms that mean "includes, but is not limited to." The term "based on" is to be read as "based at least in part on." The term "one embodiment" and "the embodiment" are to be read as "at least one embodiment." The terms "first," "second," and the like may refer to different or same objects. Other definitions, explicit and implicit, may be included herein.

As used herein, the term "determining" covers various acts. For example, "determining" may include operation, calculation, processing, derivation, investigation, searching (for example, search through a table, a database or a further data structure), identification and the like. In addition, "determining" may include receiving (for example, receiving information), accessing (for example, accessing data in the memory) and the like. Further, "determining" may include resolving, selecting, choosing, establishing and the like.

It should be appreciated that the embodiments of the present disclosure can be implemented in software, hardware, or a combination thereof. The hardware part may be implemented by a special logic; the software part may be stored in a memory and executed by a suitable instruction execution system such as a microprocessor or special purpose hardware. Those skilled in the art would appreciate that the above device and method may be implemented with computer-executable instructions and/or in processor-controlled code, and for example, such code is provided on a data carrier such as a programmable memory or an optical or electronic signal bearer.

Further, although operations of the method according to the present disclosure are described in a particular order in the drawings, it does not require or imply that these operations are necessarily performed according to this particular sequence, or a desired outcome can only be achieved by performing all shown operations. On the contrary, the order of execution for the steps as depicted in the flowcharts may be varied. Additionally or alternatively, some steps may be omitted, a plurality of steps may be merged into one step, or a step may be divided into a plurality of steps for performing. It will also be noted that features and functions of two or more units of the present disclosure may be embodied in one device. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A computer-implemented method, comprising:
generating, based on a time sequence that a plurality of requests are detected, a first-in first-out (FIFO) queue comprising the plurality of requests sent by a plurality of storage pools in a storage system for reclaiming storage spaces of the plurality of storage pools;
determining respective available storage spaces of the plurality of storage pools; and
updating, based on the available storage spaces, a sequence of the plurality of requests in the FIFO queue for processing, at least in part by:
determining, from the plurality of storage pools, at least one storage pool with available storage space less than a threshold, by determining a plurality of storage pools with available storage space less than the threshold;
determining, from among the plurality of storage pools with available storage space less than the threshold, a storage pool with a least amount of available storage space; and
adjusting a position of at least one request sent by the at least one storage pool with available storage space less than the threshold within the FIFO queue to prioritize the at least one request sent by the at least one storage pool with available storage space less than the threshold, by adjusting a position of a request sent by the storage pool with the least amount of available storage space within the FIFO queue to prioritize the request sent by the storage pool with the least amount of available storage space.

2. The method of claim 1, wherein determining the respective storage spaces of the plurality of storage pools comprises:
determining, based on a state that a storage space of a storage pool of the plurality of storage pools is allocated or reclaimed, an available storage space of the storage pool.

3. The method of claim 1, wherein updating the sequence of the plurality of requests in the FIFO queue comprises:
updating periodically the sequence of the plurality of requests at a predetermined time interval.

4. The method of claim 1, wherein adjusting the position of the at least one request in the FIFO queue comprises:
determining a number of requests to be adjusted in the at least one request sent by the storage pool; and
arranging the number of requests in the at least one request at a head of the FIFO queue.

5. The method of claim 1, further comprising arranging the plurality of requests in the FIFO queue based on a size sequence of available storage spaces in the plurality of storage pools.

6. An electronic device, comprising:
   at least one processor; and
   at least one memory storing computer program instructions, the at least one memory and the computer program instructions being configured, together with the at least one processor, to cause the electronic device to:
      generate, based on a time sequence that a plurality of requests are detected, a first-input first-output (FIFO) queue comprising the plurality of requests sent by a plurality of storage pools in a storage system for reclaiming storage spaces of the plurality of storage pools;
      determine respective available storage spaces of the plurality of storage pools; and
      update, based on the available storage spaces, a sequence of the plurality of requests in the FIFO queue for processing, at least in part by causing the electronic device to:
         determine, from the plurality of storage pools, at least one storage pool with available storage space less than a threshold by causing the electronic device to determine a plurality of storage pools with available storage space less than the threshold;
         determine, from among the plurality of storage pools with available storage space less than the threshold, a storage pool with a least amount of available storage space; and
         adjust a position of at least one request sent by the at least one storage pool with available storage space less than the threshold within the FIFO queue to prioritize the at least one request sent by the at least one storage pool with available storage space less than the threshold, by causing the electronic device to adjust a position of a request sent by the storage pool with the least amount of available storage space within the FIFO queue to prioritize the request sent by the storage pool with the least amount of available storage space.

7. The electronic device of claim 6, wherein the at least one memory and the computer program instructions are configured, together with the at least one processor, to cause the electronic device to:
   determine, based on a state that a storage space of a storage pool of the plurality of storage pools is allocated or reclaimed, an available storage space of the storage pool.

8. The electronic device of claim 6, wherein the at least one memory and the computer program instructions are configured, together with the at least one processor, to cause the electronic device to:
   update periodically the sequence of the plurality of requests at a predetermined time interval.

9. The electronic device of claim 6, wherein the at least one memory and the computer program instructions are configured, together with the at least one processor, to cause the electronic device to:
   determine a number of requests to be adjusted in the at least one request sent by the storage pool; and
   arrange the number of requests in the at least one request at a head of the FIFO queue.

10. A computer program product being tangibly stored on a non-transitory computer-readable medium and comprising machine-executable instructions, which, when executed, cause a machine to perform:
   generating, based on a time sequence that a plurality of requests are detected, a first-input first-output (FIFO) queue comprising the plurality of requests sent by a plurality of storage pools in a storage system for reclaiming storage spaces of the plurality of storage pools;
   determining respective available storage spaces of the plurality of storage pools; and
   updating, based on the available storage spaces, a sequence of the plurality of requests in the FIFO queue for processing, at least in part by:
      determining, from the plurality of storage pools, at least one storage pool with available storage space less than a threshold, determining a plurality of storage pools with available storage space less than the threshold;
      determining, from among the plurality of storage pools with available storage space less than the threshold, a storage pool with a least amount of available storage space; and
      adjusting a position of at least one request sent by the at least one storage pool with available storage space less than the threshold within the FIFO queue to prioritize the at least one request sent by the at least one storage pool with available storage space less than the threshold, by adjusting a position of a request sent by the storage pool with the least amount of available storage space within the FIFO queue to prioritize the request sent by the storage pool with the least amount of available storage space.

11. The computer program product of claim 10, wherein the machine-executable instructions, when executed, causes the machine to further execute:
   determining, based on a state that a storage space of a storage pool of the plurality of storage pools is allocated or reclaimed, an available storage space of the storage pool.

12. The computer program product of claim 10, wherein the machine-executable instructions, when executed, causes the machine to further execute:
   updating periodically the sequence of the plurality of requests at a predetermined time interval.

13. The computer program product of claim 10, wherein the machine-executable instructions, when executed, causes the machine to further execute:
   determining a number of requests to be adjusted in the at least one request sent by the storage pool; and
   arranging the number of requests in the at least one request at a head of the FIFO queue.

* * * * *